Feb. 14, 1928.
E. C. NICHOLLS
WATER COOLING APPARATUS
Filed Oct. 19, 1926
1,659,408
2 Sheets-Sheet 1
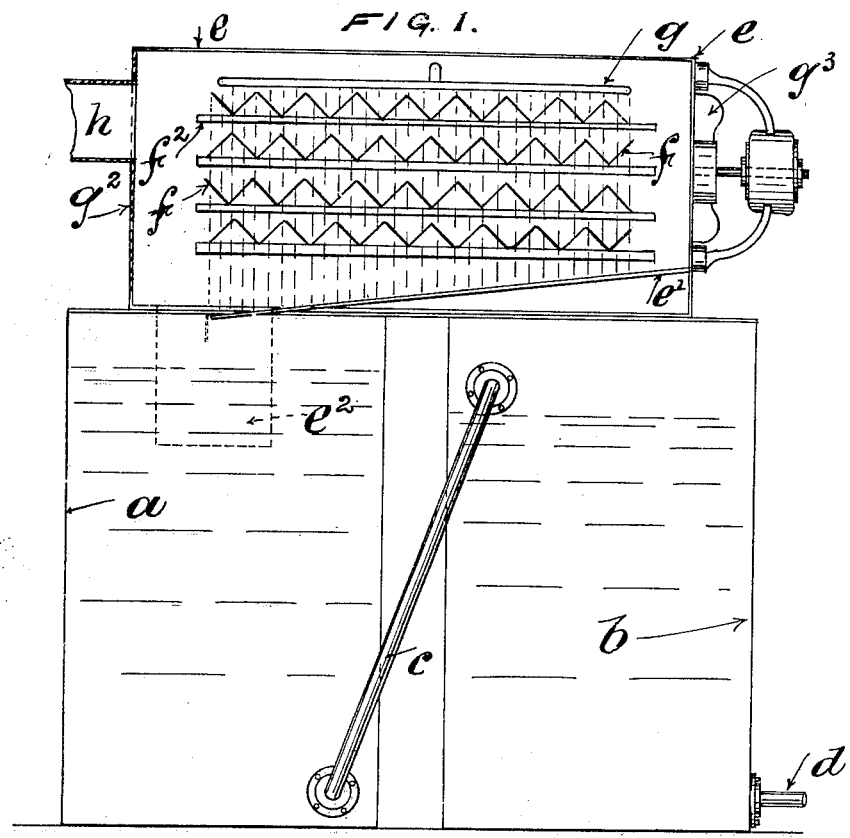
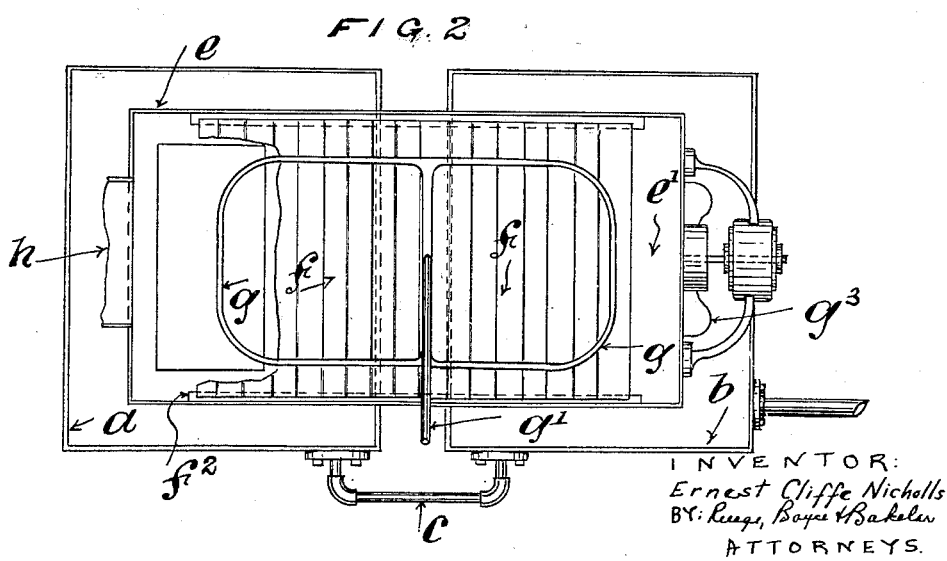
INVENTOR:
Ernest Cliffe Nicholls
BY: Reeves, Boyce & Baker
ATTORNEYS.

Feb. 14, 1928.
E. C. NICHOLLS
1,659,408
WATER COOLING APPARATUS
Filed Oct. 19, 1926  2 Sheets-Sheet 2
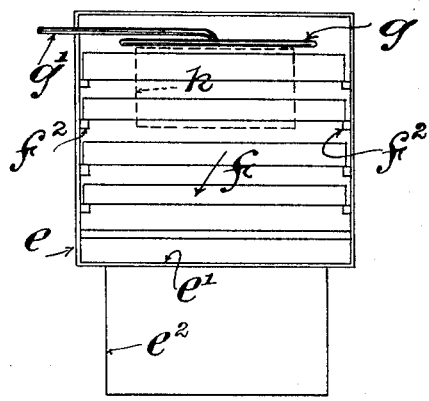
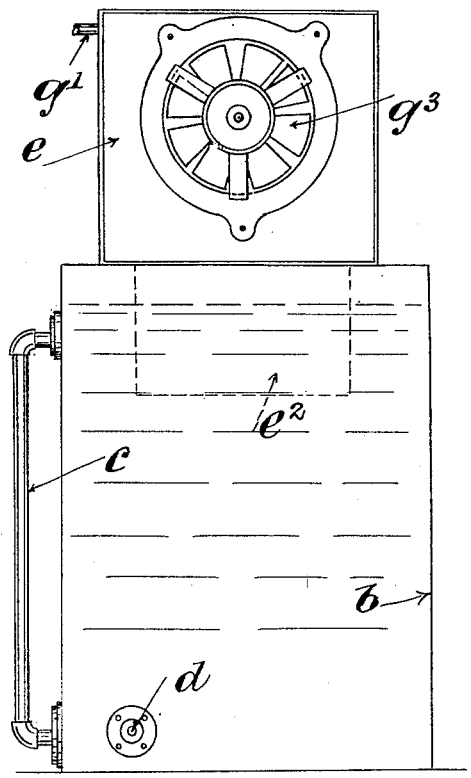
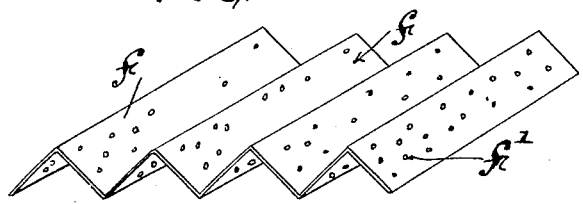
INVENTOR:
Ernest Cliffe Nicholls
BY: Ruege, Boyer & Baker
ATTORNEYS.

Patented Feb. 14, 1928.

1,659,408

UNITED STATES PATENT OFFICE.

ERNEST CLIFFE NICHOLLS, OF MANCHESTER, ENGLAND, ASSIGNOR TO GEORGE THURLOW NEWTON, OF FAIRFIELD, ENGLAND.

WATER-COOLING APPARATUS.

Application filed October 19, 1926, Serial No. 142,600, and in Great Britain October 21, 1925.

This invention relates to a simple, cheap and compact plant for cooling and circulating water in connection with mechanical refrigerating plants and has for its object to produce an apparatus which will save the very considerable waste of water now taking place and so effect a reduction in water charges to users of refrigerating apparatus, particularly where a double-pipe condenser is used in conjunction with the refrigerating plant, and further to improve the working and efficiency of the refrigerating apparatus.

The improved water cooling plant comprises a plurality of tanks interconnected one to another and with the pump of the refrigerating apparatus and with a superposed chamber over the tanks. In this chamber is a drainage base with pendent seal, perforated spaced trays, a water spray fitting, and the chamber has a fan and an air outlet.

A suitable construction of water cooling and air moistening apparatus according to my invention is hereafter described in detail and is illustrated by the attached drawings—

In the said drawings:—

Fig. 1 is a side elevation of the apparatus with the upper part shown in section.

Fig. 2 is a plan of Fig. 1.

Fig. 3 shows an end elevation of Fig. 1.

Fig. 4 is a sectional view of the upper wooden chamber and trough and its water seal appliance which is shown also in Figs. 1 and 2.

Fig. 5 indicates in perspective view one of the perforated corrugated plates or trays.

In carrying out my invention I make use of two tanks marked $a$ and $b$ and of a convenient capacity according to the particular use, and the bottom of the first tank $a$ is connected by a length of pipe $c$ to the top of the second tank $b$. From the second tank there is a pipe outlet $d$. Over the tanks $a$ and $b$ I erect a structure or housing or chamber $e$ preferably of wood and which has an inclined base $e'$ leading to a square or other downwardly projecting extension or seal $e^2$ which dips into the water in the first tank $a$ and so seals the base of the structure or housing or chamber $e$ in the first tank $a$ when the latter is full. The water level in the first tank is maintained by the pipe arrangement $c$ previously mentioned, thus enabling my plant to function properly although the second tank $b$ may be only part full. Within the wooden or non-heat conducting housing or structure $e$ are a number of superimposed perforated trays or a series of spaced reticulated surfaces. The drawing illustrates a series of corrugated trays $f$ which are perforated at $f'$ and supported by wooden side rails $f^2$. Over the top of such trays $f$ I apply perforated pipes $g$ which receive via the entrance pipe $g'$ the heated water from the refrigerating plant. The water is sprinkled upon the perforated trays $f$ through holes or outlets or roses on the pipes, and falls through the series of trays $f$ and is so atomized. The sprinkled water, so sprayed and falling, presents a large surface of drops of moisture to the current of air.

At one end of the structure or housing $e$ I apply a partition $g^2$ and at the other an electric or other fan $g^3$ and this fan $g^3$ blows air horizontally between the perforated screens $f$ and so causes a certain small amount of the atomized water to evaporate, thus causing a reduction in temperature of the water. At the other end, is an uptake and a horizontal or other outlet $h$ for the air forced horizontally through by the fan. If desired, the plant may be connected up or arranged to deliver the moistened air where required and so to serve as an apparatus supplying moistened air.

The circulating of the water is effected by a pump worked from the compressor of the refrigerating plant, or by a separate motor. The hot water is liberated through the perforated pipes $g$ over the screens or perforated troughs $f$ and the cooled water is drawn along the pipe $d$ from the second tank by a pump worked from the refrigerating apparatus or otherwise.

The indicated plant is capable of cooling the water necessary for working a refrigerating plant any number of hours per day without further loss of water, save by evaporation, and will materially reduce the difference in temperature between the inlet and outlet of the condenser water, thus reducing the condenser pressure of the refrigerant, so effecting a saving of power absorbed, whilst enabling the refrigerating plant to run at its maximum efficiency. The whole apparatus is very compact and effective and gives no trouble in use.

The perforated corrugated trays $f$ due to the presence of the corrugations due to the sprayed water and the passing of the air current over to the corrugated trays cause vacuum pockets to be formed at the corrugations. This helps the cooling process. Also the pipes connecting the tanks are so arranged that the coldest water is carried from the bottom of the first tank $a$ to the second tank $b$ and so on if more than two tanks are used.

I declare that what I claim is:—

1. A water cooling apparatus, comprising a pair of tanks, a pipe connecting one tank near its base with the other tank near its upper end, a cooling chamber disposed above said tanks for delivering cooled water to the first of said tanks, and means carried by said chamber and adapted to form a water-seal in said first tank thereby to prevent the passage of air from the cooling chamber into the tank.

2. A water cooling apparatus, comprising a pair of tanks, a pipe connecting one tank near its base with the other tank near its upper end, a cooling chamber disposed above said tanks for delivering cooled water to the first of said tanks, means for forcing a current of air through said chamber in a direction transversely of the tanks, and means carried by said chamber and adapted to form a water-seal in said first tank thereby to prevent the passage of air into the tank.

In testimony whereof I have signed my name to this specification.

ERNEST CLIFFE NICHOLLS.